United States Patent [19]
Pattantyus et al.

[11] Patent Number: 5,517,431
[45] Date of Patent: May 14, 1996

[54] SPEED SENSOR AND CONDITIONING CIRCUIT

[75] Inventors: Tamas I. Pattantyus, North Olmsted; Ronald E. Squires, Grafton, both of Ohio

[73] Assignee: AlliedSignal Truck Brake Systems, Elyria, Ohio

[21] Appl. No.: 202,319

[22] Filed: Feb. 28, 1994

[51] Int. Cl.⁶ ........................................... G01P 21/02
[52] U.S. Cl. .......................... 364/565; 73/2; 73/514.39; 324/207.11; 324/207.15; 324/166; 324/173
[58] Field of Search ............................. 73/1 R, 2, 517 R, 73/518; 324/207.11, 207.15, 166, 167, 173; 364/481, 561, 565

[56] References Cited

U.S. PATENT DOCUMENTS 3,525,044   8/1970   Richmond ............................. 324/173
5,251,469  10/1993   Chan ...................................... 73/1 DV
5,426,970   6/1995   Florida et al. ..................... 73/517 R X

*Primary Examiner*—Edward R. Cosimano
*Attorney, Agent, or Firm*—Gus T. Hampilos

[57] ABSTRACT

A speed signal conditioning and test circuit includes a comparator which is connected to a digital input port of a microprocessor and which switches its output in response to the alternating current generated by the sensor when sensing wheel speed. A test sequence is initiated by injecting a signal into a tuned circuit formed by the inductance of the sensor coil, the filtering capacitors, and associated circuit resistances. The voltage output of the tuned circuit increases exponentially and switches the comparator to provide a test pulse of a predetermined time period. The microprocessor times the pulse to establish that an operative sensor is present. Since the inductance of the coil is switched out of the circuit in the case of an open or shorted sensor coil, no pulse is generated and the microprocessor accordingly determines that a defective sensor is present.

18 Claims, 2 Drawing Sheets

5,517,431

SPEED SENSOR AND CONDITIONING CIRCUIT

This invention relates to a vehicle wheel speed sensor and a conditioning circuit which processes the output of the sensor, and which also tests the sensor to assure that the sensor is in proper operating condition.

BACKGROUND OF THE INVENTION

Antilock braking systems have become increasingly popular in both passenger cars and heavy duty vehicles. These systems require accurate wheel speed signals which vary in accordance with vehicle wheel speed. Such wheel speed signals are generated by wheel speed sensors. These wheel speed sensors include a serrated tone wheel, which is mounted for rotation with the vehicle wheel; a sensing head, which is mounted to a non-rotating part of the vehicle adjacent to the tone wheel; and a conditioning circuit, which receives the signals generated by the sensing head. The sensing head consists of a coil wound around a cylindrical permanent magnet, the end face of which is in close proximity with the tone wheel. The tone wheel is made out of a ferromagnetic material and is provided with serrations circumferentially spaced equally around the tone wheel. As the tone wheel turns in front of the sensing head, the flux density inside of the coil will change depending on whether the end face of the permanent magnet is facing a tooth or a serration defined by two adjacent teeth. This flux change induces an alternating voltage in the coil, the frequency of which is equal to the rate of change of the teeth and gaps of the Tone wheel rotating past the end face of the magnet. Accordingly, the frequency of the output of the sensor is a direct measure of the vehicle wheel speed.

Since wheel speed sensors are critical components of the adaptive braking system, it is necessary to test the integrity of the speed sensors at regular intervals, at and after engine start up. The sensing head is normally tested for an open circuit through the coil or a short circuit across the sensing head, although sometimes speed sensors are checked only for an open circuit, the most common fault. The most common way of Testing speed sensing heads is by injecting a test signal through the head. The test is controlled by a microprocessor which receives the wheel speed signal through a digital input port during normal operation of the sensor. The test signal is transmitted by the microprocessor to the sensing head, and a return test signal is received at an analog port of the microprocessor. This return signal indicates whether the sensing head is in satisfactory operating condition or is faulty. The main disadvantage of this prior art testing arrangement is that it ties up microprocessor resources; that is, both a digital and an analog port are required for each speed sensor, with the analog port used only during the test sequence.

SUMMARY OF THE INVENTION

The present invention eliminates the need for an analog port and uses some of the same components in the conditioning circuit that are used during normal operation of the sensor. The microprocessor examines the signal received at the digital port during the test sequence to determine if the speed sensor is faulty.

BRIEF DESCRIPTION OF THE DRAWINGS

These and other advantages of the present invention will become apparent from the following description, with reference to the accompanying drawings, in which.

DETAILED DESCRIPTION OF THE INVENTION

Figure 1:
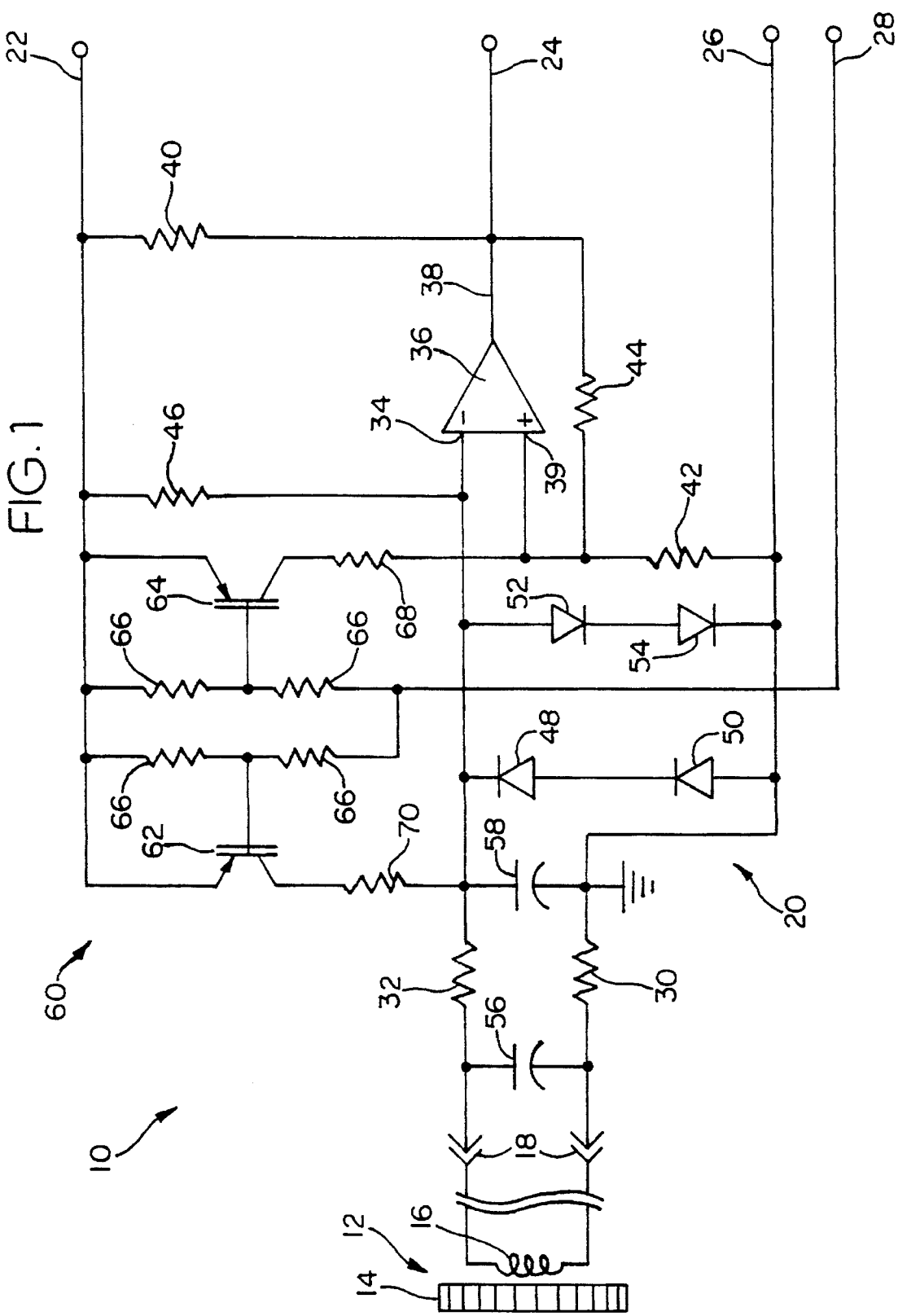
FIG. 1 is a schematic illustration of the speed sensor, tone wheel and conditioning circuit made pursuant to the teachings of the present invention.

Referring now to the drawings, a wheel speed sensing and conditioning circuit generally indicated by the numeral 10 includes a wheel speed assembly 12 consisting of a conventional, ferromagnetic, serrated tone wheel 14 and a sensing head comprising a permanent magnet (not shown) with a coil 16 wrapped thereround. Connectors 18 connect the coil 16 with a conditioning circuit generally indicated by the numeral 20. The conditioning circuit 20 includes a terminal 22, for connection with a voltage source; a terminal 24, which is connected to the aforementioned digital input port of the microprocessor (not shown), which receives and processes the signals from the sensor assembly 12; a grounding terminal 26; and a test terminal 28, which is high during normal operation of the conditioning circuit 20, but goes low when a test to the sensor head 16 is initiated. The signal at terminal 28 is controlled by the aforementioned microprocessor.

One side of the coil 16 is connected through resistor 30 to the ground terminal 26, and the other side of the coil 16 is connected through resistor 32 to the negative node 34 of a comparator 36, the output 38 of which is connected to the terminal 24. The output 38 of comparator 36 is also biased to the voltage source 22 through resistor 40. The positive node 39 of comparator 36 is set at either of two fixed reference signals (if the conditioning circuit 20 is operating in the normal as opposed to the test mode), which are established by resistors 42 and 44. Resistor 44 is a positive feed back resistor and is connected to the output terminal 38 of the comparator 36. Accordingly, the reference level at terminal 39 is relative high when the output 38 is high, and is at a lower reference level when the output level 38 of comparator 36 is low. The input 34 of comparator 36 is biased to the voltage at terminal 22 through resistor 46. The voltage at terminal 34 is limited to two diode drops above and below ground by the diodes 48, 50, 52, 54. In the normal mode, the signal from coil 16 is filtered by capacitors 56, 58 and the resistor 32.

Conditioning circuit 20 further includes a test circuit generally indicated by the numeral 60. Test circuit 60 includes transistors 62, 64 which are normally turned off when the conditioning circuit 20 operates in the normal mode to process the wheel speed signal generated by the sensing assembly 12. However, the gate electrodes of the transistor 62, 64 are controlled by the test signal on terminal 28 through the bias resistors 66. Normally, the transistors 62, 64 are turned off, but when a test sequence is initiated by the microprocessor, the signal at terminal 28 goes low, thereby turning on the transistors 62, 64. When transistors 62, 64 are turned on, the bias on the positive node 39 of comparator 36 is increased because the resistor 68 has been switched into the circuit thereby connecting the node 39 with the voltage at 22. Also, the signal at the negative node 34 of comparator 36 is also substantially increased due to the fact that the resistor 70 has also been switched into the circuit.

In operation, when the conditioning circuit 20 operates in the normal mode to condition wheel speed signals generated by sensing assembly 12, transistors 62 and 64 are off. A small current is forced through the coil 16 from the supply voltage at 22 through resistors 46, 32 and 30, thereby biasing the negative node 34 slightly positive. As discussed above, the positive node 39 can be either of two values, depending upon whether the voltage ($e_o$) at the output terminal 38 is high or low. Accordingly, the comparator 36 switches the level at the output 38 from high to low and then from low to high in response to the alternating current generated by the sensing assembly 12 as discussed above and as is also well known to those skilled in the art. The pulses thereby generated by the comparator 36 are transmitted to the digital in port of the aforementioned microprocessor through the terminal 24. The microprocessor then processes the wheel speed sensors to control vehicle braking, according to any well known methods familiar to those skilled in the art.

Figure 2:
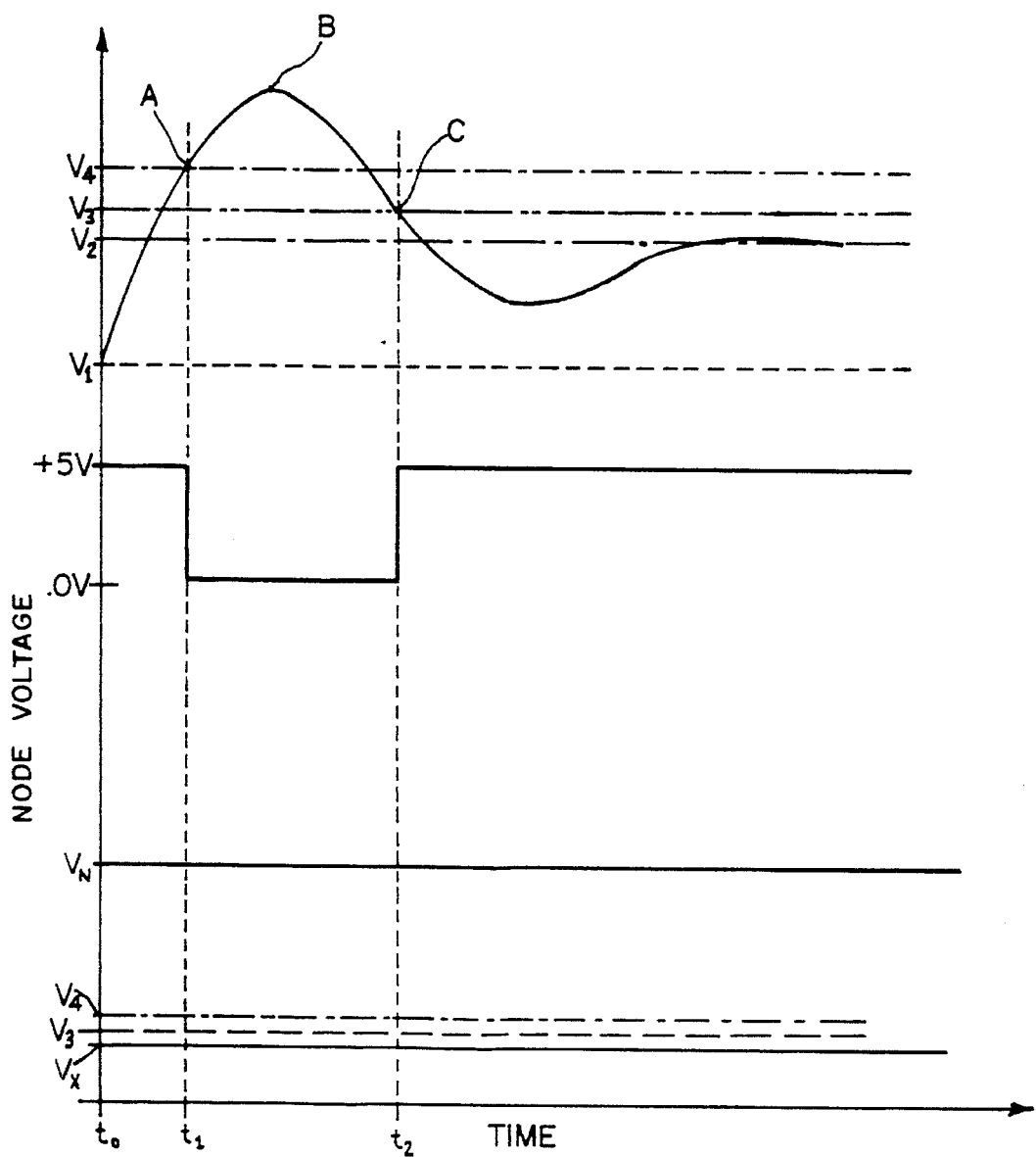
FIG. 2 is a graphical representation of the operation of the device schematically illustrated in FIG. 1 during the aforementioned test sequence.

As discussed above, it is customary to test the sensing assembly 12 at predetermined times, for example, during vehicle start-up, or when the wheel speed signal is small or zero (slow speed/stationary wheel) to determine if the coil 16 is either open or shorted. When the test is performed, transistors 62 and 64 are turned on in response to the signal at the test terminal 28 going low, thereby switching the resistors 68 and 70 into the circuit. Referring now to FIG. 2, (upper graph) the voltage level $V_1$ indicates the steady state voltage at node 34 before the test was initiated. As also discussed above, the voltage of positive node 39 will switch back and forth in response to switching of the output 38 of comparator 36, and the two voltage levels will be slightly above and below the voltage level $V_1$. When the transistors 62 and 64 are turned on, the voltage at the negative node is switched to the much higher voltage $V_2$, and the voltage at the positive node 39 is switched to the voltage level $V_3$ when the voltage $e_o$ at output 38 is low, and is switched to the voltage level $V_4$ if the voltage level $e_o$ at output 38 is high. When the transistor 62 is turned on, the voltage level at terminal 22 is also injected into the coil 16. The inductance of the coil 16 and the capacitance of the capacitors 56 and 58, and the resistances of the associated circuit resistors, form a tuned circuit which is excited by the injection of voltage by turning on the transistor 62. The tuned circuit generates a resonating voltage which increases exponentially to a maximum, then decreases exponentially, and eventually dampens out. Accordingly, the voltage at the negative node 34 of comparator 36 will begin to increase exponentially when the transistor 62 is turned on. When this voltage level increases to the reference level at positive node 39 of comparator 36, as indicated at point A in FIG. 2, at time $t_1$, voltage $e_o$ at output 38 of the comparator switches states (from high to low); however, the voltage generated by the tuned circuit will overshoot and begin decreasing only at point B. Of course, since the voltage $e_o$ at output 38 has switched states, the reference level at positive node 39 also switches from the voltage $V_4$ of FIG. 2 to the voltage level $V_3$. Accordingly, the voltage at negative node 34 begins decreasing after the maximum overshoot at point B is reached. When the voltage at node 34 drops below the (lower) reference level at node 39 represented by voltage level $V_3$ (represented by C in FIG. 2), the overshoot at point B will be followed by an undershoot, and the output of the tuned circuit will eventually be dampened as indicated in the upper graph of FIG. 2.

Referring to the middle graph on FIG. 2, which shows the output voltage of comparator 36, when the comparator switches at points A and C in the upper graph, a pulse of a predetermined time period $t_1$–$t_2$ will be produced. This pulse will be transmitted to the digital input terminal to which the terminal 24 is connected. The microprocessor is programmed to, during the test cycle, look for the pulse of the time period $t_1$–$t_2$. If the pulse is received, the microprocessor knows that the sensor assembly 12 is operating satisfactorily. Assuming that the values of the inductance of the coil 16 and capacitors 56, 58 are constant and the voltage supply is relatively constant, the time period $t_1$–$t_2$ will also be constant for each check of the sensor.

If the coil 16 is an open circuit, the resistor 46 will attempt to pull up the voltage at the negative node 34 to a high level, higher than that permitted by the diode drops 52 and 54. Accordingly, in the case of an open circuit, the voltage level at negative node 34 is pulled up to the maximum permitted by the diode drops. Since this is significantly higher than the voltage produced by the tuned circuit, it is also sufficiently significantly higher than the voltage levels $V_3$ and $V_4$ as indicated in the bottom graph of FIG. 2 (which are the same as the voltage levels $V_3$ and $V_4$ in the upper graph). Accordingly, no switching of the transistor will occur, and the output voltage $e_o$ will remain low. No pulse will be received at the microprocessor, and a faulty sensor will be indicated. In the case of a shorted sensor, the voltage at negative node 34 will be pulled low due to the fact that a resistance of the coil 16 will have been switched out of the circuit. The voltage levels $V_3$ and $V_4$ are chosen to be substantially higher than this low level, as noted by the voltage level $V_x$ in the third graph of FIG. 2. Again, no switching of the comparator can take place, no output pulse will be generated, and the microprocessor can determine that a defective sensor is present.

We claim:

1. Speed sensor and conditioning circuit for measuring the rotational speed of a rotating member, comprising a sensing head including an inductive coil, said conditioning circuit including a comparator having an active input receiving the pulses generated by the sensing head, said comparator comparing the pulses generated by the sensing head with a reference signal and generating an output signal transmitted to a digital input port of a microprocessor, said conditioning circuit further including test circuit means for receiving a test signal from said microprocessor and causing said comparator to generate an output pulse of a predetermined duration if the speed sensing head is operative, said output pulse being transmitted to said digital input port.

2. Speed sensor and conditioning circuit as claimed in claim 1, wherein said test circuit includes means for generating a time varying signal when said sensing head is operative, said comparator receiving the time varying signal at said active input and comparing said time varying signal with said reference signal to generate said output signal when the level of the time varying signal attains said reference signal.

3. Speed sensor and conditioning circuit as claimed in claim 9, wherein said test circuit means includes means responsive to said test signal for switching the value of said reference signal from a normal sensing value to at test value.

4. Speed sensor and conditioning circuit as claimed in claim 1, wherein said test circuit means includes capacitance and resistive means defining with the inductive coil a tuned electronic circuit excited by said test signal when the sensing head is operative for generating a time varying signal, said comparator receiving the time varying signal at said active input and comparing said time varying signal with said reference signal to generate said output signal when the level of the time varying signal attains said reference signal.

5. Speed sensor and conditioning circuit as claimed in claim 4, wherein said test circuit means includes means for clamping a predetermined voltage level at the active input when said coil is an open circuit thereby preventing said comparator from switching states.

6. Speed sensor and conditioning circuit as claimed in claim 4, wherein said test circuit means includes means for maintaining a level at the active input causing said comparator to switch states and remaining in the state to which said comparator is switch for indefinite time period, whereby an output signal is generated for an indefinite duration instead of an output pulse generated for said predetermined duration.

7. Speed sensor and conditioning circuit as claimed in claim 4, wherein said test circuit means includes means responsive to said test signal for switching the value of said reference signal from a normal sensing value to a test value.

8. Speed sensor and conditioning circuit as claimed in claim 7, wherein a hystersis circuit switches said normal sensing value between higher and lower level as the output of the comparator is switched between levels and also switches said test value between higher and lower values as the output of the comparator is switched during generation of said test signal.

9. Speed sensor and conditioning circuit as claimed in claim 8, wherein said test circuit means includes means for clamping a predetermined voltage level at the active input when said coil is an open circuit thereby preventing said comparator from switching states.

10. Speed sensor and conditioning circuit as claimed in claim 8, wherein said test circuit means includes means for maintaining a level at the active input causing said comparator to generate an output signal for an indefinite duration instead of said output pulse generated for said predetermined duration.

11. Method of testing a speed sensor and conditioning circuit for measuring the rotational speed of a rotating member and for transmitting a signal representing said rotational speed to a digital input port of a microprocessor, said speed sensor including a sensing head including an inductive coil, said conditioning circuit including a comparator having an active input receiving the pulses generated by the sensing head, said method including the steps of causing said microprocessor to generate a test signal, transmitting said test signal to said conditioning circuit, exciting a tuned electronic circuit including said inductive coil with said test signal for causing said tuned electronic circuit to generate a time varying signal if the sensing head is operative, transmitting said time varying circuit to said comparator, causing said comparator to generate an output pulse of a predetermined duration if the time varying signal is generated, and transmitting said output pulse to said digital input port of the microprocessor.

12. Method of testing a speed sensor as claimed in claim 11, including the steps of comparing said time varying signal with said reference signal, and generating said output signal when the level of the time varying signal attains said reference signal.

13. Method of testing a speed sensor as claimed in claim 12, including the steps of clamping a predetermined voltage level at an active input of said comparator when said coil is an open circuit thereby preventing said comparator from switching states.

14. Method of testing a speed sensor as claimed in claim 12, including the steps of maintaining a level at said active input of said comparator causing said comparator to generate an output signal for an indefinite duration instead of said output pulse generated for said predetermined duration.

15. Speed sensor and conditioning circuit for measuring the rotational speed of a rotating member, comprising a sensing head including an inductive coil, and a serrated tone wheel having circumferentially spaced serrations, said tone wheel being mounted for rotation with said rotating member, said sensing head being mounted adjacent said tone wheel and being responsive to rotation of the serrations past said sensing head to generate a pulsed output signal, said conditioning circuit including a comparator having an active input receiving the pulses generated by the sensing head, said comparator comparing the pulses generated by the sensing head with a reference signal and generating an output signal transmitted to a digital input port of a microprocessor, said conditioning circuit further including test circuit means for receiving a test signal from said microprocessor and causing said comparator to generate an output pulse of a predetermined duration if the speed sensing head is operative, said output pulse being received at said digital input port.

16. Speed sensor and conditioning circuit as claimed in claim 15, wherein said test circuit means includes capacitance and resistive means defining with the inductive coil a tuned electronic circuit excited by said test signal when the sensing head is operative for generating a time varying signal, said comparator receiving the time varying signal at said active input and comparing said time varying signal with said reference signal to generate said output signal when the level of the time varying signal attains said reference signal.

17. Speed sensor and conditioning circuit as claimed in claim 16, wherein said test circuit means includes means for clamping a predetermined voltage level at the active input when said coil is an open circuit thereby preventing said comparator from switching states.

18. Speed sensor and conditioning circuit as claimed in claim 16, wherein said test circuit means includes means for maintaining a level at the active input causing said comparator to generate an output signal for an indefinite duration instead of said output pulse generated for said predetermined duration.

* * * * *